United States Patent [19]
Albert

[11] 4,227,751
[45] Oct. 14, 1980

[54] BALL BUSHING WITH AXIAL EXTENDING BALL GUIDES

[75] Inventor: Ernst Albert, Sand, Fed. Rep. of Germany

[73] Assignee: Deutsche Star Kugelhalter GmbH, Schweinfurt, Fed. Rep. of Germany

[21] Appl. No.: 3,855

[22] Filed: Jan. 16, 1979

[30] Foreign Application Priority Data

Jan. 27, 1978 [DE] Fed. Rep. of Germany ....... 2803615
Apr. 6, 1978 [DE] Fed. Rep. of Germany ....... 2814917

[51] Int. Cl.$^3$ .............................................. F16C 29/06
[52] U.S. Cl. .................................................. 308/6 C
[58] Field of Search .............. 308/6 C, 203, 6 A, 6 R, 308/237 R, 245; 64/23.7

[56] References Cited

U.S. PATENT DOCUMENTS

| | | | |
|---|---|---|---|
| 3,844,629 | 10/1974 | Haines | 308/6 C |
| 3,940,187 | 2/1976 | Suda | 308/6 C |
| 4,062,602 | 12/1977 | Nilsson | 308/6 C |

Primary Examiner—Lenard A. Footland
Attorney, Agent, or Firm—Toren, McGeady and Stanger

[57] ABSTRACT

An axially elongated ball bushing is inserted into a bore in a housing. The ball bushing includes an axially elongated cage having a plurality of ball loops each extending in the axial direction of the cage and containing a number of balls located in a loaded ball duct and an unloaded ball duct of the loop. Each loaded ball duct is open through the radially inner and outer surfaces of the cage. The ducts of the loops are arranged so that, in each loop, its loaded ball duct is adjacent the loaded ball duct in one adjacent loop and its unloaded ball duct is adjacent the unloaded ball duct in the other adjacent loop. A joint race insert formed of a thin hardened sheet steel bridges each pair of adjacent loaded ball ducts and the race portions of the inserts are bent radially outwardly against the surface of the bore by the loaded balls, however, the inserts do not yield in the thickness direction.

24 Claims, 7 Drawing Figures

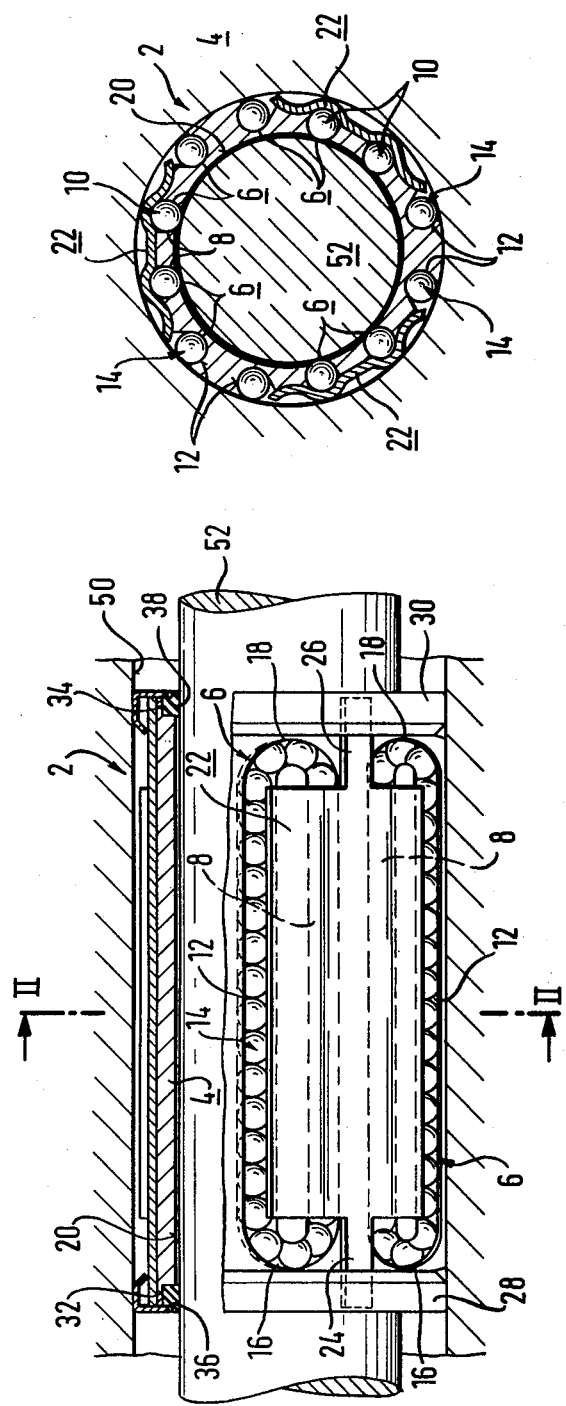

BALL BUSHING WITH AXIAL EXTENDING BALL GUIDES

SUMMARY OF THE INVENTION

The present invention is directed to a ball bushing providing axially extending ball guidance for shafts or the like and the bushing includes an axially extending cage containing a number of endless ball loops. Each loop contains a loaded ball duct and an unloaded ball duct with the loaded ball duct being open radially outwardly. A race insert covers the radially outer openings of the loaded ball ducts, in particular, the invention is directed to a cage structure where each loop has its loaded ball ducts adjacent the loaded ball duct in one of the adjacent ball loops and its unloaded ball duct adjacent the unloaded ball duct in the other adjacent loop. A joint race insert provides a pair of parallel races covering the openings in two adjacent loaded ball ducts.

The cage receives and guides the balls and supports the race inserts and, therefore, is constructed of a low strength material which can be easily shaped and worked. The race inserts absorb the forces acting on the balls and transmit them to the surface of the housing bore which encloses the ball bushing. Generally, the race inserts are formed of a hardened steel.

Ball bushings of this general type are known. In such known ball bushings, the race inserts are in the form of massive steel bars. Dimensional variations in the races of such inserts are unavoidable, particularly as a result of distortion on hardening, and have the effect that an uneven load distribution occurs with the result that the load capacity as well as the service life of the unit is reduced, note German Pat. No. 1,268,442. Particularly in ball bushings where the races are arranged in pairs adjacent one another, there is the further disadvantage that, as a result of unavoidable finishing tolerances, differences in the cross-sectional height of the race inserts occur and lead to uneven load distribution between the two races, and, thus, to an additional reduction in load capacity and service life, note German Offenlegungsschrift No. 2,341,046. By a support arrangement which permits tilting of the race inserts in the circumferential direction of the bushing, the load distribution between the two races in a race insert can be compensated, however, the uneven load distribution in the axial direction of the races cannot be eliminated, note German Offenlegungsschrift No. 2,363,033.

Another solution for the compensation of load distribution in the two races formed in a race insert is also described in the last mentioned German Offenlegungsschrift. In that arrangement, the race insert is designed so that the races yield flexibly when a load is applied. Aside from the fact that the stiffness of the ball bushing and, thus, the precision of its guiding action is significantly reduced, with such an arrangement it is not possible to compensate for any uneven load distribution in the axial direction of the races.

Another disadvantage of the known ball bushings, particularly where the races are arranged in pairs in a race insert, involves the fact that the outer diameter of the ball bushing increases considerably due to the necessary large cross-sectional height of the races.

Therefore, it is the primary object of the present invention to provide a ball bushing of the general type described above which has a high load capacity and, accordingly, a long service life and affords a simple and especially compact design containing little resilience.

In accordance with the present invention, the ball bushing includes race inserts formed of a thin-walled material which is flexible in respect to bending but is unyielding in its thickness dimension and, preferably, is constructed with a uniform cross-sectional thickness. Further, the race insert, at least in the region of the races, can be pressed radially outwardly against the surface of the housing bore enclosing the ball bushing.

The housing bore can be constructed with a very high degree of accuracy without any problems. The thickness dimension of the race inserts can also be maintained with a high degree of accuracy. Since the race inserts do not have a high natural stiffness, basically they do not absorb any forces, but rather transmit the forces to the surface of the housing bore. Accordingly, the accuracy of the housing bore becomes the determining factor for the accuracy of the races. When an axially elongated ball guide is assembled, any differences in the races in the race inserts can be compensated in the axial direction by the thin walled material of the inserts making contact with the surface of the bore. As a result, a uniform load distribution within and between the races is ensured whereby the highest load capacity, a long service life, and the lowest resilience under load are guaranteed.

In a preferred embodiment of the invention, the race insert includes a pair of races laterally connected together by an intermediate web.

In one variation of this preferred embodiment, the intermediate web includes a slot, preferably an axially elongated slot, which can be locked to at least one fastening tongue formed on the cage with outwardly projecting lips on the tongue for effecting holding engagement with the surface of the insert along the slot. It is unnecessary for the fastening tongue to be designed to absorb high forces, since, as mentioned above, the race insert is supported by the surface of the housing bore.

In another feature of the present invention, each race insert at its ends extending transversely of the axial direction of the ball bushing has projecting portions which extend from the intermediate web and fit into holding rings which can be slipped onto the end of the bearing bushing. This embodiment affords a very simple design of the cage, since the fastening tongues can be eliminated.

In still another feature of the invention, the fastening rings placed on the ends of the ball bushing are formed as cover plates each with a circular opening to allow the shaft to pass through it. The cover plates protect the ball bushing against the penetration of dirt and the like. The cover plates may also include sealing rings placed into corresponding inner recesses of the ball cage so that the sealing rings contact the shaft.

When a cage is used which has radially outwardly open ball ducts for the unloaded, returning rows of balls, in accordance with the present invention, the race inserts extend laterally or circumferentially from the race portions along the loaded ball rows and cover at least a portion of the adjacent unloaded ball ducts. Accordingly, the ball ducts have a very simple shape which does not narrow down toward the radially outer surface of the cage. Such a configuration makes the insertion of the balls very simple. The race inserts extend laterally over the unloaded ball ducts so that the opening is limited to a dimension smaller than the diameter of the balls so that the balls cannot fall out.

In yet another embodiment of the invention, the axially extending edges of the race inserts terminate in the circumferential direction of the ball bushing at the same location as the outer sides of the loaded ball ducts. In this arrangement the unloaded ball ducts are closed on the radially outer surface of the cage and open through its radially inner surface. The openings along the radially inner surface are provided with inwardly projecting webs which confine the balls from extending inwardly from the radially inner surface of the cage. Such a construction, particularly when used in combination with the above-described cover plates, affords a ball bushing which is completely closed about its outer surfaces and which is well protected against the penetration of dirt and the like.

Preferably, the race inserts are formed of thin sheet steel and the cross-sectional configuration of the inserts is provided by a chipless procedure, for example, by embossing. The ball cage can be constructed in a known manner from plastics material or other materials which can be easily formed and worked.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view, partly in section and with another portion cut away, of a ball bushing embodying the present invention;

FIG. 2 is a cross-sectional view taken along the line II—II of FIG. 1;

DETAIL DESCRIPTION OF THE INVENTION

Figure 3:
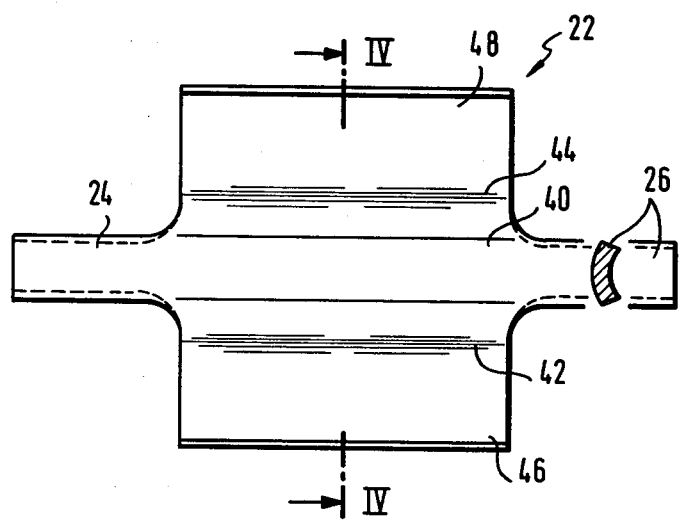
FIG. 3 is a side view, with a portion shown in transverse section, of a race insert with fastening projecting portions as shown in FIG. 1.

In FIGS. 1 and 2, a ball bushing 2 is positioned within an axially extending housing bore 50 and includes an axially elongated cage containing six endless ball loops 6. Each ball loop consists of a ball duct 8 for a loaded ball row 10 and a ball duct 12 for an unloaded ball row 14 with a deflection arc 16, 18 at each of the ends of the ball ducts for completing the endless loops.

The loaded ball ducts 8 are open through the radially inward surface of the cage so that the balls of the loaded ball rows 10 project inwardly beyond the radially inner surface 20 of the cage 4. In addition, the loaded ball ducts 8 are open through the radially outer surface of the cage. As can be seen in FIG. 2, each of the endless ball loops 6 is arranged so that its loaded ball duct 8 is adjacent the loaded ball duct 8 in one of the adjacent ball loops and its unloaded ball duct 12 is adjacent the unloaded ball duct in the other adjacent ball loop. The races for each adjacent pair of loaded ball rows 10 are formed by a joint race insert 22. As can be seen best in FIG. 2, the ball ducts 12 of the unloaded ball rows 14 are closed radially inwardly, but are opened through the radially outer surface of the cage. These openings through the radially outer surface are not limited relative to the diameter of the balls, accordingly, the balls can be easily inserted into the unloaded ball ducts 12. To prevent the balls from falling out of the ball ducts 12, the race insert 22 is extended laterally or in the circumferential direction of the ball bushing so that the axially extending edges of the insert prevents the balls in the ball ducts 12 from falling out. In the regions of the deflection arcs 16, 18, the ball loops may be narrowed so that the balls are held within the arcs. The length of the race inserts 22 extending in the axial direction of the cage corresponds, at least approximately, to the length of the straight ball duct sections of the ball loops 6.

At its ends or edges extending transversely of the axial direction of the ball ducts 8, 12, each race insert is provided with projecting portions 24, 26 which extend axially outwardly from the insert into the plates 28, 30 placed across the ends of the ball bushing. In this manner, the race inserts are fixed to the tubular shaped cage 4. As displayed in FIG. 1, each end of the tubular cage 4 has an inner recess 32, 34 in which sealing members 36, 38 are seated. In combination with the sealing members 36, 38, the cover plates 28, 30 seal the ends of the ball bushing in the axial direction against penetration of dirt and the like.

Figure 4:
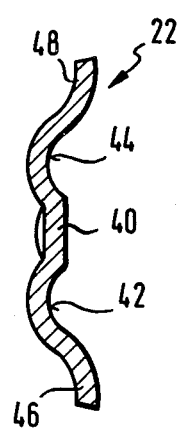
FIG. 4 is a cross-sectional view taken along the line IV—IV in FIG. 3.

Each race insert 22 is formed of a thin-walled piece of sheet metal which is elastic with respect to bending. The race insert is shaped to provide the races by means of stamping or embossing. As shown in FIG. 3, the web consists of an axially extending intermediate web 40 with a race, 42, 44 extending along each of its axially extending sides with the races extending laterally outwardly from the web. Each of the races 42, 44 is shaped to conform to the radius of the balls used in the cage. Further, extending laterally or in the circumferential direction of the cage, from the races is a axially extending part 46, 48 which projects laterally over a portion of the adjacent opening in the unloaded ball ducts 12, note FIG. 2. As can be seen in FIG. 4, each race 42, 44 and its adjacent part 46, 48 extending partially over the opening in the unloaded ball ducts 12, have an approximate S-shaped configuration as viewed in transverse cross-section. Further, the transverse cross-section of each of the projecting parts 24, 26 has the shape of a circular arc whose center is located on the central axis of the ball bushing, so that the projecting parts adjust to the edge portions of the cover plates 28, 30 which receive the projecting parts.

In the assembly of a ball bushing, initially, the ball loops 6 are filled with the required number of balls. Subsequently, the race inserts 22 are mounted on and fastened by means of the cover plates 28, 30. The ball bushing can now be inserted into the housing bore 50. When a shaft 52 is inserted through the ball bushing, the balls in each row 10, that is in the loaded ball ducts 8, are pressed radially outwardly. Since the race inserts 22 are formed to be elastic with respect to bending, the inserts do not absorb any forces, however, they yield outwardly until they contact the surface of the bore 50. Since these bores can be formed very accurately with simple means, and since the races are also formed very accurately, a high load capacity is achieved. Furthermore, since the material of the race inserts is very hard with regard to compression, it does not yield in the radial or thickness direction, therefore, no harmful resilience in the radial direction develops.

Figure 5:
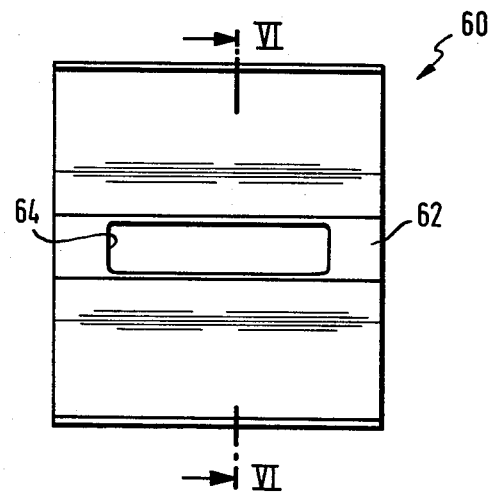
FIG. 5 is another race insert with a fastening slot.
Figure 6:
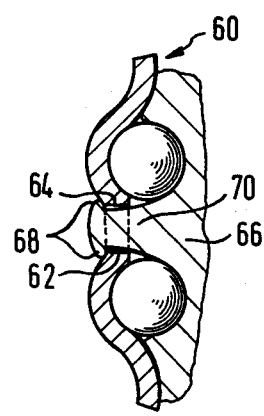
FIG. 6 is a cross-sectional view taken along the line VI—VI of FIG. 5.

In FIGS. 5 and 6 is shown another embodiment of a race insert 60. The race insert 60 has essentially the same cross-sectional shape as the race insert illustrated in FIGS. 3 and 4. In the intermediate web 62, however, a slot 64 is provided. As is shown in FIG. 6, a fastening tongue 70 formed on the ball cage 66, extends through the slot 64 and is provided with axially extending lips 68 which overlap and lock the insert 60 to the radially outer surface of the cage. Because of the interlocking action provided between the fastening tongue 70 and the slot 64, projecting parts from the opposite transverse ends of the race insert, such as shown in FIGS. 3 and 4, are unnecessary.

Figure 7:
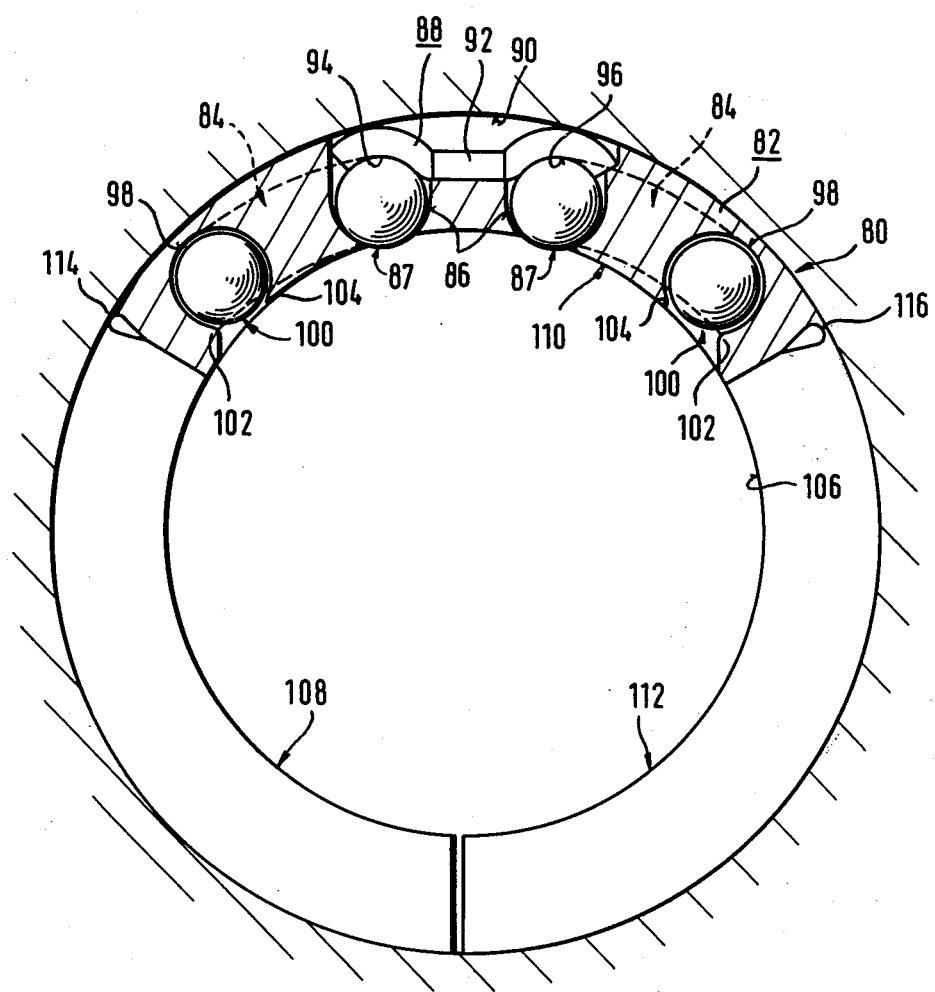
FIG. 7 is a cross-sectional view of a portion of a ball bushing illustrating another embodiment of the present invention.

In FIG. 7 a cross-section of another embodiment of a ball bushing 80 incorporating the present invention, is illustrated. The ball bushing 80 includes a cage 82 which also has six endless ball loops 84, though only two are shown. Loaded ball ducts 86 containing rows 87 of loaded balls open through the radially inner surface and radially outer surface of the cage 82. In the radially outward direction, the loaded ball ducts 86 are covered by a joint race insert 88 which rests elastically against the surface of the housing bore 90 into which the bushing is inserted. The joint race insert 88 has an axially extending intermediate web 92 with a race 94, 96 extending laterally outwardly from the web along each of its axially extending sides. The axially extending edges of the races spaced circumferentially outwardly from the intermediate web 92 terminate along the outer edges of the loaded ball ducts 86, that is, the recesses do not project laterally or circumferentially beyond the ducts 86. Unlike the previous embodiment illustrated in FIGS. 1 and 2, the ball ducts 98 holding the rows 100 of unloaded balls are open through the radially inner surface of the cage, however, the radially outer sides of the ducts are closed. To prevent the balls in the unloaded ball rows 100 from extending radially inwardly beyond the radially inner surface of the cage, each of the edges of the ducts 98 is provided with an edge lip 102,104 which retains the balls within the limits of the thickness of the cage wall so that the balls do not contact the shaft extending through the ball bushing.

The mounting of the race insert 88 on the cage can be carried out in the same manner as described above and illustrated in FIGS. 3, 4 or 5, 6 and, therefore, is not illustrated in detail.

The ball bushing displayed in FIG. 7 is completely closed about its outer periphery and is protected against the penetration of dirt. As illustrated, cage 82 consists of three segments 108, 110, 112 each extending along an arc of 120°. The segment 110 is connected to the segments 108, 112 through thin, flexible hinge webs 114, 116. Accordingly, the cage can be produced as a flat band and then bent into a circular shape during assembly. The shape of the cage is maintained and the cage is centered by cover plates such as the cover plates 28, 30 shown in FIG. 1.

Furthermore, it is possible to eliminate the hinge webs 114, 116 and to assemble the cage in three separate segments shaped along their abutting edges so that they are joined together along their entire radial thickness.

In the various embodiments of the race inserts described above, the race inserts 22, 60, 88 each have a wall thickness which is less than 50% of the diameter of the balls. Preferably, the wall thickness of the race inserts is less than 40%. With regard to the diameter of the shaft, the wall thickness of the race inserts 22, 60 and 88 is less than 10% of the shaft diameter. Preferably, the wall thickness of the race inserts is less than 8% of the shaft diameter.

In the region of the races of the race inserts 22, 60, 88 which bridge over the rows 10, 87 of the loaded balls in the ball ducts, the wall thickness of the race inserts is less than 2.5 mm. Preferably, the thickness of the race inserts is less than 1.5 mm in the race portions.

The race inserts 22, 60 and 88 are sufficiently flexible so that both of the races are contacted by the balls in adjacent loaded ball rows, so that the inserts make contact with the surface of the housing bore along the regions of the loaded ball rows. Preferably, contact is achieved over the entire length of the loaded ball rows.

While specific embodiments of the invention have been shown and described in detail to illustrate the application of the inventive principles, it will be understood that the invention may be embodied otherwise without departing from such principles.

What is claimed is:

1. Ball bushing arrangement for an axially elongated ball guide for shafts and the like comprising a housing having an axially elongated bore therethrough, an axially elongated tubular shaped cage positioned within said housing bore and having a plurality of endless ball loops therein extending in the axial direction of the cage, said cage having a radially inner surface and a radially outer surface, said ball loops spaced circumferentially apart around said cage and each containing a plurality of balls, each said loop having a first ball duct for a row of loaded balls and a second ball duct for a row of unloaded balls, each first ball duct being open through the radially inner and radially outer surfaces of said cage, each said ball loop arranged with said first ball duct therein adjacent to said first ball duct in the adjacent said ball loop along one axially extending side and said second ball duct therein adjacent to said second ball duct in the adjacent said ball loop along the other axially extending side, a joint race insert extending in the axial direction of said race along the radially outer surface and covering two adjacent said first ball ducts, wherein the improvement comprises that each said joint race insert is formed of a thin wall material which is elastic with respect to bending forces and is unyielding in the thickness direction thereof, said joint race insert being displaceable by said balls in said first ball ducts radially outwardly against the surface of said housing bore laterally enclosing said ball bushing.

2. Ball bushing arrangement, as set forth in claim 1, wherein each said joint race insert has two laterally spaced races formed therein extending in the axial direction of said cage and an intermediate web positioned between and interconnecting said races with said web extending in the axial direction of said cage.

3. Ball bushing arrangement, as set forth in claim 2, wherein said intermediate web has a slot therethrough extending in the axial direction of said cage, an axially extending tongue formed on the radially outer surface of said cage with said tongue extending through said slot, and holding lips extending along the axially extending edges of said tongue projecting through said slot with said holding lips extending laterally outwardly over said intermediate web for securing said ball insert to said cage.

4. Ball bushing arrangement, as set forth in claim 2, wherein an extension is formed on and extends axially outwardly from each of the opposite ends of said race inserts extending transversely of the axial direction of the cage, said extensions projecting from said ends in the axial direction of said cage, and a holding ring positioned at each transverse end of said cage with each said extension arranged to be fitted into the adjacent said holding ring.

5. Ball bushing arrangement, as set forth in claim 4, wherein each said holding ring on the opposite ends of said cage has a circular opening therethrough to allow a shaft to extend through said cage.

6. Ball bushing arrangement, as set forth in claim 1, wherein each said second ball duct is open through the radially outer surface of said cage, said race inserts project in the circumferential direction of said cage laterally beyond said first ball ducts and at least cover a portion of the adjacent second ball ducts.

7. Ball bushing arrangement, as set forth in claim 6, wherein the openings from said second ball ducts in the radially outer surface of said cage are wide enough to permit said unloaded balls therein to pass radially outwardly from said cage and said portions of said race inserts projecting circumferentially outwardly from said races therein extend over said second ball ducts for a sufficient distance to limit the opening through the radially outer surface of the cage to a dimension smaller than the diameter of the balls.

8. Ball bushing arrangement, as set forth in claim 6, wherein each race in said race insert and the adjacent laterally outwardly projecting part which covers the adjacent second wall duct have an approximate S-shape in cross-section extending transversely of the axial direction of said cage.

9. Ball bushing arrangement, as set forth in claim 1, wherein the edges of said race inserts extending in the axial direction of said cage terminate approximately at the outer edges of said first ball ducts which said race insert covers, and said second ball ducts are closed through the radially outer surface of said cage, said second ball ducts are opened through the radially inner surface of said cage and the axially extending edges of said second ball ducts have inwardly projecting lips which retain the balls therein within the limits of the wall thickness of said cage.

10. Ball bushing arrangement, as set forth in claim 1, wherein said race inserts are formed of a thin hardened sheet steel and the cross-sectional shape of said race inserts is formed in a chipless procedure, such as embossing.

11. Ball bushing arrangement, as set forth in claim 1, wherein said cage is formed of a plastics material.

12. Ball bushing arrangement, as set forth in claim 1, wherein the races within said race inserts have a wall thickness which is less than 50% of the diameter of the balls in said ball loops.

13. Ball bushing arrangement, as set forth in claim 12, wherein the wall thickness of the races in said race insert have a thickness of 40% of the ball diameter.

14. Ball bushing arrangement, as set forth in claim 1, wherein the wall thickness of the races in said race inserts is less than 10% of the diameter of the radially inner surface of said cage through which a shaft can be placed.

15. Ball bushing arrangement, as set forth in claim 14, wherein the wall thickness of the races in said race inserts is less than 8% of the diameter of the radially inner surface of said cage.

16. Ball bushing arrangement, as set forth in claim 1, wherein the thickness of said races in said race inserts is less than 2.5 mm.

17. Ball bushing arrangement, as set forth in claim 16, wherein the wall thickness of the races in said race inserts is less than 1.5 mm.

18. Ball bushing arrangement, as set forth in claim 1, wherein said race inserts at least in the region of the races therein are flexible so that the radially outer surfaces of said race inserts located opposite the first ball ducts contact the surface of said housing bore surrounding said cage at the location of the individual balls therein as a result of the force transmitted through the balls.

19. Ball bushing arrangement, as set forth in claim 1, the adjacent races in said inserts are flexible so that under load they contact the surface of said housing bore in the regions of said first ball ducts along the entire length of said first ball ducts.

20. Ball bushing arrangement, as set forth in claim 19, wherein said race inserts are weakened in the region therebetween due to the bending within the races therein because of the forces transmitted outwardly by the balls through the race insert to the surface of said housing bore.

21. Ball bushing arrangement, as set forth in claim 1, wherein said cage includes several individual equiangular segments in contacting abutment with one another along the axially extending edges thereof so that they bear against one another for their entire radial thickness.

22. Ball bushing arrangement, as set forth in claim 1, wherein said cage consists of a plurality of equiangular segments with at least all but one of the joints therebetween formed of thin flexible hinge webs.

23. Ball bushing arrangement, as set forth in claim 22, wherein said segments are shaped at the axially extending edges thereof so that they contact each other along said edges for the full radial thickness thereof.

24. Ball bushing arrangement, as set forth in claim 1, wherein said race inserts each have the same constant radial thickness.

* * * * *